United States Patent
Amerga et al.

(10) Patent No.: US 7,110,765 B2
(45) Date of Patent: Sep. 19, 2006

(54) LIMITING CELL RESELECTION BASED ON PILOT POWER

(75) Inventors: Messay Amerga, San Diego, CA (US); Sudhir Halbhavi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 429 days.

(21) Appl. No.: 10/317,385

(22) Filed: Dec. 12, 2002

(65) Prior Publication Data

US 2004/0043769 A1    Mar. 4, 2004

Related U.S. Application Data (60) Provisional application No. 60/406,455, filed on Aug. 27, 2002.

(51) Int. Cl.
*H04Q 7/20* (2006.01)
(52) U.S. Cl. .................. 455/436; 455/437; 455/438; 455/439; 455/440; 455/442; 455/443
(58) Field of Classification Search ............... 455/436, 455/437, 438, 439, 440, 442, 443
See application file for complete search history.

(56) References Cited

U.S. PATENT DOCUMENTS

| 5,436,956 | A * | 7/1995 | Shiotsuki et al. | 455/441 |
| 6,067,460 | A * | 5/2000 | Alanara et al. | 455/574 |
| 6,195,551 | B1* | 2/2001 | Kim et al. | 455/436 |
| 6,360,098 | B1* | 3/2002 | Ganesh et al. | 455/436 |
| 2001/0031638 | A1* | 10/2001 | Korpela et al. | 455/449 |
| 2002/0102976 | A1* | 8/2002 | Newbury et al. | 455/436 |
| 2002/0197992 | A1* | 12/2002 | Nizri et al. | 455/435 |
| 2003/0153370 | A1* | 8/2003 | Sako | 455/574 |
| 2004/0033805 | A1* | 2/2004 | Verma et al. | 455/444 |

FOREIGN PATENT DOCUMENTS

WO        0167788        9/2001

* cited by examiner

*Primary Examiner*—Joseph Feild
*Assistant Examiner*—Huy D Nguyen
(74) *Attorney, Agent, or Firm*—Philip R. Wadsworth; Charles D. Brown; George C. Pappas (57) ABSTRACT

Techniques for limiting cell reselection in response to a variable channel are disclosed. In one aspect, a measurement of received pilot power from a base station is used as an indication of channel quality. In another aspect, hysteresis is applied to limit cell reselection, wherein the hysteresis is greater in relatively higher quality channel environments and lower in relatively lower channel quality environments. Various other aspects are also presented. These aspects have the benefit of reducing cell reselection, thus increasing time spent in low-power mode, thereby reducing power consumption and increasing standby time.

27 Claims, 6 Drawing Sheets

LIMITING CELL RESELECTION BASED ON PILOT POWER

RELATED APPLICATIONS

This application claims benefit of U.S. Provisional Patent Application No. 60/406,455, filed Aug. 27, 2002 and entitled "WCDMA PHYSICAL LAYER REQUIREMENTS FOR CELL SELECTION AND RESELECTION."

FIELD

The present invention relates generally to communications, and more specifically to a novel and improved method and apparatus for limited cell reselection based on pilot power.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

When a mobile station first acquires a system, one or more available base stations or cells are identified by the mobile station. Typically a single cell is selected as the serving cell. When the mobile station is not actively communicating for a voice call or data session, it is said to be in idle mode. The mobile station monitors signals from the serving cell to determine if an event, such as an incoming call, would require the mobile station to leave idle mode. As the connnunication channel between the serving cell and the mobile station changes, the mobile station must periodically test the channel to determine if that cell is still suitable. For example, the communication channel will change as the mobile station moves between cells within a system or between one or more neighboring systems. Occasionally a new serving cell will be selected, a process known as cell reselection in W-CDMA, or idle mode handoff in IS-95 or cdmu2000.

During idle mode, a mobile station may enter a low-power state, or "sleep" state, to reduce power consumption. A mobile station may discontinue reception during sleep state to allow receive circuitry to be disabled. Periodically, the mobile station must come out of sleep state, or "wake up", reacquire the serving cell, and monitor signals therefrom to determine if an incoming call is being directed to the mobile station. During this time, a cell reselection process may be performed to determine if cell reselection is necessary. It is desirable for the mobile station to go back to the sleep state as soon as possible if it is to remain in idle mode, in order to conserve power. If a cell reselection is performed, the mobile station will remain awake longer, in order to process the reselection.

As channel conditions change, for example, due to movement of the mobile station within the system, or changes in the interference experienced, the serving cell may need to be adapted accordingly. Two or more base stations may, at any given time, have comparable quality metrics. Slight changes in the channel environment may cause the ranking of these base stations to change. However, reselecting a cell with comparable quality to the current cell may yield only marginal improvement, or none at all. Since cell reselection increases the time required before returning to sleep, it is desirable to limit reselection that would yield marginal or no improvement.

Furthermore, variations in the relative quality of the channel may cause variations in the desire for cell reselection. In a relatively good channel environment, cell reselection may be less desirable, since the current serving cell provides ample communication quality. On the other hand, in a relatively poor channel environment, gains from cell reselection may improve communication performance. Thus, limiting cell reselection, adapted appropriately for changing channel quality conditions, can increase time spent in a low-power, or sleep, mode, thus reducing idle mode power and increasing standby time. There is therefore a need in the art for limiting cell reselection in response to a variable channel.

SUMMARY

Embodiments disclosed herein address the need for limiting cell reselection in response to a variable channel. In one aspect, a measurement of received pilot power from a base station is used as an indication of channel quality. In another aspect, hysteresis is applied to limit cell reselection, wherein the hysteresis is greater in relatively higher quality channel environments and lower in relatively lower channel quality environments. Various other aspects are also presented. These aspects have the benefit of reducing cell reselection, thus increasing time spent in low-power mode, thereby reducing power consumption and increasing standby time.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
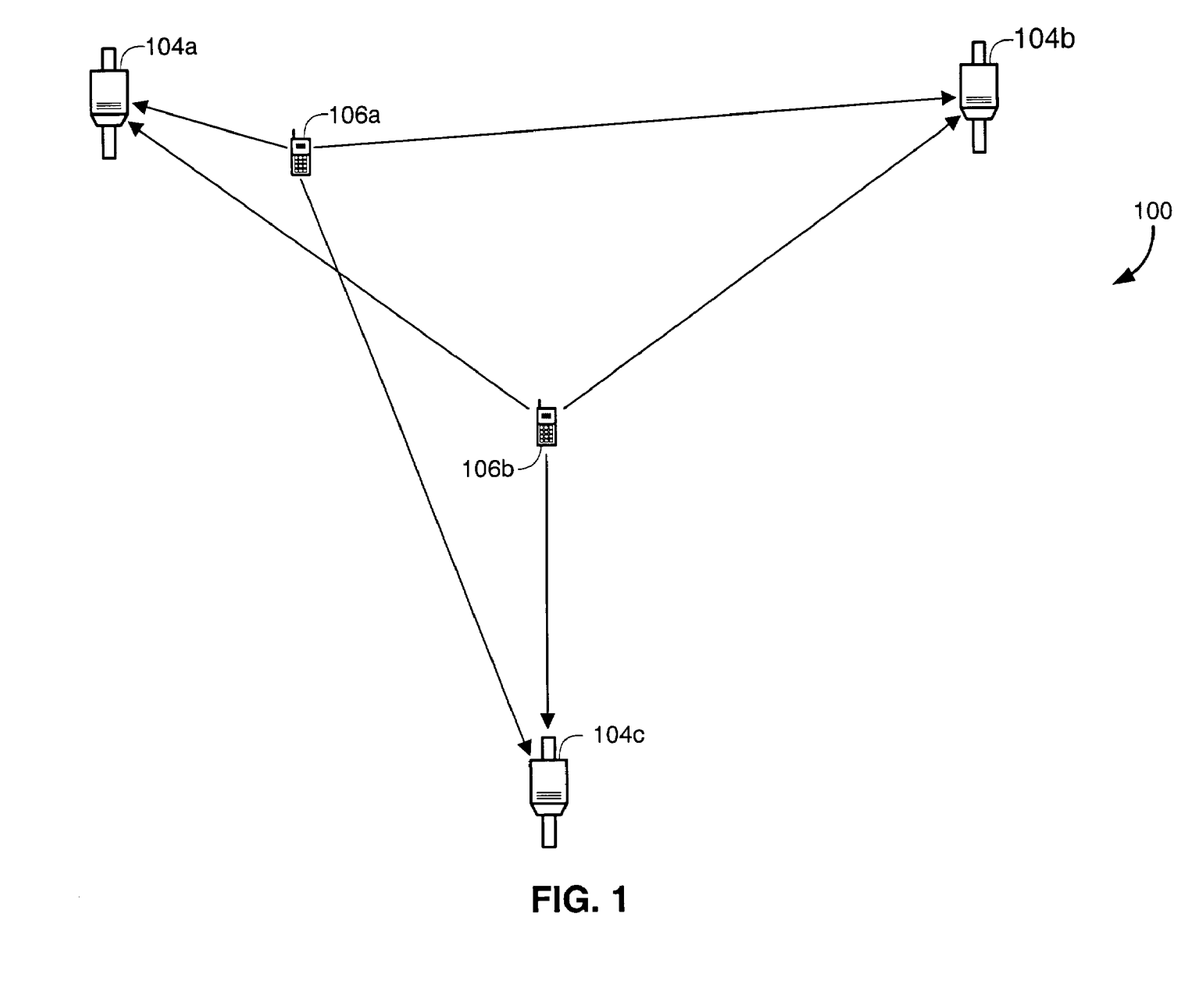
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). In an alternative embodiment, system 100 may also deploy any wireless standard or design other than a CDMA system, such as a GSM system. In the exemplary embodiment, system 100 may contain base stations conforming to the W-CDMA standard as well as the GSM standard.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

As described above, cell selection is the process that allows a mobile station to select a suitable cell of a particular system. A mobile station first accesses a system (during power-up, for example), and selects a base station, or serving cell, with which to establish communication, in accordance with certain cell selection conditions. A mobile station may be in idle mode, that is, without an active call or data session in progress. In idle mode, the mobile station can intermittently monitor the serving cell to, among other things, determine if an incoming call is being directed to the mobile station. In a typical wireless communication system, a mobile station will maintain communication with, or "camp" on, a single cell while in idle mode. Periodically, a mobile station can monitor the serving cell to determine if the selection conditions are still being met. Surrounding base stations can be monitored to determine if the mobile station should attempt to reselect to another cell. Cell reselection is the process that allows the mobile station to detect and camp on a more "suitable" cell than the current serving cell. Cell reselection is a term used in the W-CDMA standard, and the process is similar to idle handover in IS-95 or IS-2000 systems. In each of these three exemplary systems, cell selection and reselection is autonomously completed by the mobile station. Thus, a mobile station can roam in and between various systems, updating the current serving cell as appropriate, with a minimal amount of signaling required between the mobile station and the various cells or base stations within the systems.

A mobile station commonly maintains various lists of base stations or cells in and around its current location. An active set is the set of cells with which the mobile station is communicating. It is common for the active set to contain only a single cell, the serving cell, while the mobile station is in idle mode, although the active set can contain any number of cells within the scope of the present invention. A list of neighboring cells may be kept in a neighbor list. A set of cells that should be periodically monitored, for example, when the serving cell no longer meets the selection conditions, can be kept in a monitored list. Various techniques for determining active sets, neighbor lists, monitored lists, and the like are well known in the art, and any such technique can be deployed within the scope of the present invention.

In FIG. 1, a mobile station 106 may be operable with one or more communication systems 100, conforming to one or more standards, examples of which are given above. A system standard commonly provides requirements for cell selection, reselection and the like. In some cases, procedures are not specified directly, but performance criteria are set forth that must be adhered to by base stations or mobile stations within the system. An exemplary cell selection procedure conforming to the W-CDMA standard, and operable with multiple system formats (including W-CDMA and GSM) is detailed below with respect to FIGS. 5A and 5B. However, the principles of the present invention are not limited to W-CDMA systems, and can be applied to any communication system.

It is typically desirable for a mobile station to minimize power consumption, which yields increased standby or "talk" times for a given battery configuration, or allows a reduced cost and/or smaller battery. For the purpose of discussion, the embodiments herein are described in the context of idle mode operation, a mode in which low power operation is desirable. In the exemplary W-CDMA embodiment, cell reselection (as defined herein) occurs during idle mode. Active mode operation provides for cell handoff according to a different set of procedures. However, this distinction is for clarity of discussion only. Those of skill in the art will readily adapt the principles disclosed herein to any system or mode in which limiting cell reselection is desirable.

In the exemplary W-CDMA embodiment, a mobile station can enter "sleep" mode, which can be interchanged with the term idle mode herein. In sleep mode, the mobile station sequences through one or more Discontinuous Reception (DRX) cycles until the mobile station receives or initiates an incoming call or data transmission. During each DRX cycle, the mobile station goes to sleep, discontinuing reception, and disabling as much circuitry as possible to achieve a low power state. For example, radio frequency (RF) and baseband processing components may be shut off during this time. During each DRX cycle, the mobile station "wakes up" to monitor the current serving cell. The mobile station may need to search for and locate the serving cell if the communication channel has changed or the timing between the base station and mobile station has drifted. The serving cell can be measured to determine if the selection conditions are still being met. Periodically the monitored set may need to be searched to determine if reselection is in order. Once the current serving cell is located (and possibly updated through reselection), the mobile station can monitor the serving cell (for example, a paging channel), and return to sleep for the next DRX cycle if active communication is not required. Reducing the portion of a DRX cycle during which a mobile station must remain awake allows for a corresponding savings in power. Since cell reselection takes additional time, during which the mobile station is awake, power can be reduced by limiting cell reselection to only those times when reselection would provide substantial benefits. Embodiments described herein provide for cell reselection limitation that dynamically adapts to changes in the communication channel experienced by the mobile station.

In the exemplary embodiment, a system exhibiting features included in the W-CDMA and GSM standards is deployed. Those of skill in the art will recognize that the principles disclosed herein can be extended to a variety of alternate systems.

Figure 2:
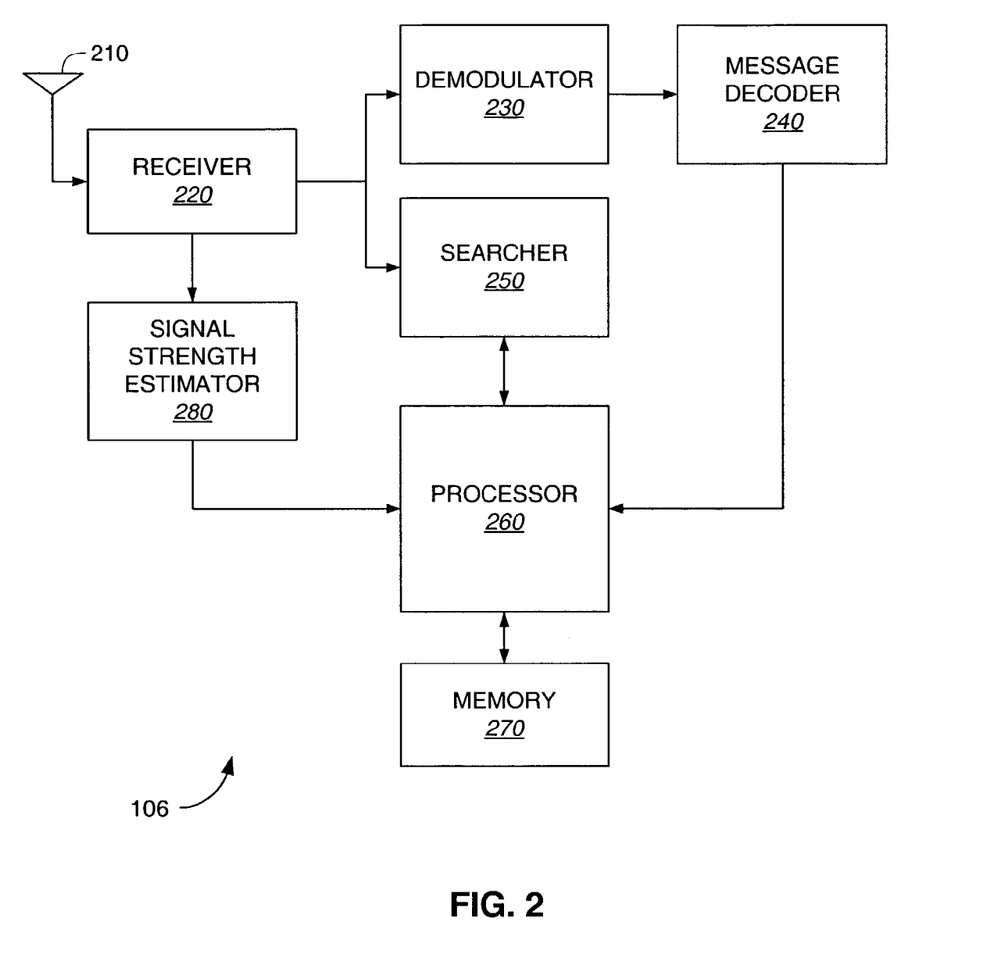
FIG. 2 depicts an exemplary embodiment of a mobile station equipped for cell selection and reselection.

FIG. 2 depicts a portion of an embodiment of a mobile station 106. Signals are received at antenna 210 and delivered to receiver 220. Receiver 220 performs processing according to one or more wireless system standards, such as the cellular standards listed above. Receiver 220 performs various processing such as Radio Frequency (RF) to baseband conversion, amplification, analog to digital conversion, filtering, and the like. Various techniques for receiving are known in the art. Note that some or all of the components of receiver 220 can be disabled or put in a low-power state to conserve power while sleeping in idle mode.

The mobile station 106 can communicate with a base station 104 by tuning receiver 220 according to the parameters associated with the base station. Receiver 220 may be directed to periodically tune to an alternate frequency to measure the channel quality of a cell on an alternate frequency, including those on alternate systems. Receiver 220 may be used to measure channel quality of the current serving cell, as well neighbor base stations, although a separate signal strength estimator 280 is shown in FIG. 2 for clarity of discussion (detailed below).

Signals from receiver 220 are demodulated in demodulator 230 according to one or more communication standards. In the exemplary embodiment, a demodulator capable of demodulating W-CDMA and GSM signals is deployed. Additional standards, such as IS-95 or cdma2000, could also be supported in an alternate embodiment. Demodulator 230 may perform RAKE receiving, equalization, combining, deinterleaving, decoding, and various other functions as required by the format of the received signals. Various demodulation techniques are known in the art.

Message decoder 240 receives demodulated data and extracts signals or messages directed to the mobile station 106 by the system 100 through one or more base stations 104. Message decoder 240 decodes various messages used in setting up, maintaining and tearing down a call (including voice or data sessions) on a system. Messages may include neighbor cell information. Messages may include various parameters for use in cell selection and reselection, detailed further below. Various other message types are known in the art and may be specified in the various communication standards being supported. The messages are delivered to processor 260 for use in subsequent processing. Some or all of the functions of message decoder 240 may be carried out in processor 260, although a discrete block is shown for clarity of discussion.

Signals from receiver 220 are also directed to searcher 250. Searcher 250 can be used to locate various cells available to the mobile station, including the serving cell and neighboring cells. Searcher 250 can be directed by processor 260 to search for cells and to indicate channel quality metrics associated with those cells to processor 260. Search results can be used to direct demodulator 230 to demodulate various signals, as well as for use in cell selection or reselection. Searcher 250 may be deployed to support searching cells of any type of system supported by mobile station 106.

Signal strength estimator 280 is connected to receiver 220, and used for making various power level estimates for use in the cell selection or reselection process, as well as for use in various other processing used in communication, such as demodulation. Signal strength estimator 280 is shown as a discrete block for clarity of discussion only. It is common for such a block to be incorporated within another block, such as receiver 220 or demodulator 230. Various types of signal strength estimates can be made, depending on which signal or which system type is being estimated. In the exemplary embodiment, various pilot signals from one or base stations are used for signal strength estimation, examples of which are detailed below. In general, any type of channel quality metric estimation block can be deployed in place of signal strength estimator 280 and is within the scope of the present invention. The channel quality metrics are delivered to processor 260 for use in cell selection or reselection, as described herein.

Data received may be transmitted to processor 260 for use in voice or data communications, as well as to various other components. A mobile station 106 will generally be equipped with modulation and transmission components for transmitting data to one or more base stations. Additional components for supporting voice communications or data applications are well known in the art and are not shown.

Processor 260 may be a general purpose microprocessor, a digital signal processor (DSP), or a special purpose processor. Processor 260 may perform some or all of the functions of receiver 220, demodulator 230, searcher 250, signal strength estimator 280, message decoder 240, as well as any other processing required by the mobile station. Processor 260 may be connected with special purpose hardware to assist in these tasks (details not shown). Data or voice applications may be external to mobile station 106, such as an externally connected laptop computer, may run on an additional processor within mobile station 106 (not shown), or may run on processor 260 itself. Processor 260 is connected with memory 270, which can be used for storing data as well as instructions for performing the various procedures and methods described herein. Those of skill in the art will recognize that memory 270 may be comprised of one or more memory components of various types, that may be embedded in whole or in part within processor 260.

Figure 3:
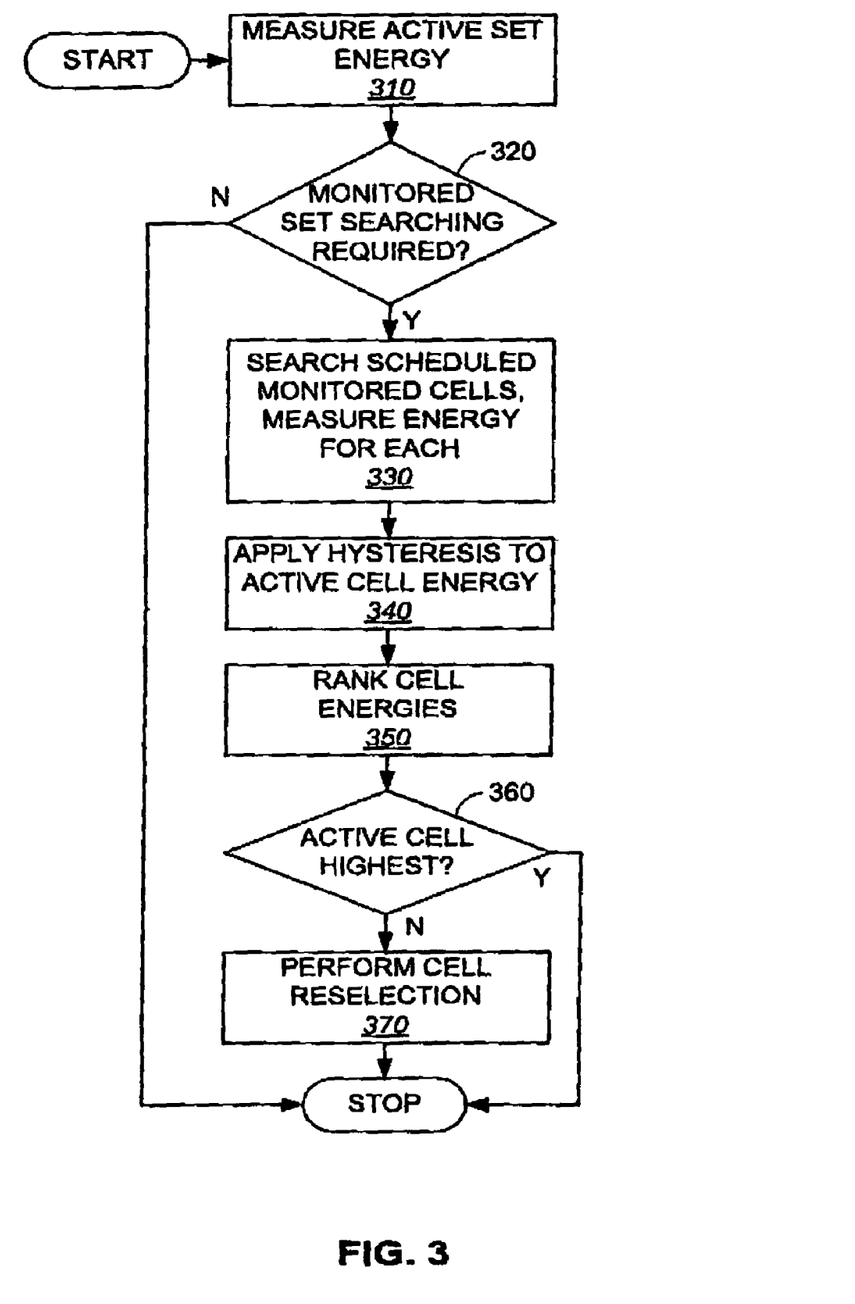
FIG. 3 is a flowchart of an embodiment of a method of cell reselection.

FIG. 3 depicts an embodiment of a method of limiting cell reselection based on received pilot power. In the exemplary embodiment, the method of FIG. 3 is performed once during each DRX cycle. The process begins in step 310, after the period during which reception was disabled. The received energy of the current active set, i.e., the active set used during the previous DRX cycle, is measured. Proceed to decision block 320.

In decision block 320, a determination is made whether or not searching of the monitored set is required. Under certain conditions, if the measured energy of the active set is sufficient, there is no need to determine the quality of alternate base stations indicated in the monitored set, and the process can stop. No cell reselection will be required, and the current active set remains the active set. If searching of the monitored set is indicated, proceed to step 330. Steps 330–370 can be used to make a cell reselection decision, limited to avoid excessive reselection, in accordance with the principles of the present invention. Various techniques for determining the need for additional searching are known in the art, an example of which is detailed below with respect to FIGS. 5A and 5B. Any technique, known or developed in the future, can be deployed with the cell reselection methods described herein.

In step 330, searching is performed on all scheduled cells in the monitored list, and the energy is measured for each. The definition of the monitored set may vary, and, as such, a subset of the available cells may be searched in this step. For example, a subset of cells on the current frequency may be searched, or on multiple frequencies, or even over multiple systems (neighboring GSM cells, for example). Various methods for determining the desired set of monitored cells for searching in step 330 are known, examples of which are detailed below with respect to FIGS. 5A and 5B, and any method can be deployed within the scope of the present invention. In the exemplary embodiment, the energy of the pilot of each cell in the monitored list is measured. Once this list of candidate energies is measured, proceed to step 340.

In step 340, a hysteresis value is applied to the measured energy of the current active set. The hysteresis value may be comprised of one or more components. In the exemplary embodiment, one of the components of the hysteresis value is determined in response to the measured energy in one or more of the pilots of the active set. Another component, for example, may be signaled by the system to the mobile station. Utilizing at least one component that is determined in response to the current channel conditions, as measured by the mobile station, allows cell reselection to be dynamically adapted in response to the quality of the current active set as seen by the mobile station. Thus, cell reselection can be made more likely when conditions are relatively poor, thus increasing the likelihood of locating a more suitable cell. When conditions are relatively good, reselection can be made less likely, thus avoiding cell reselections that may provide little or no improvement.

Figure 4:
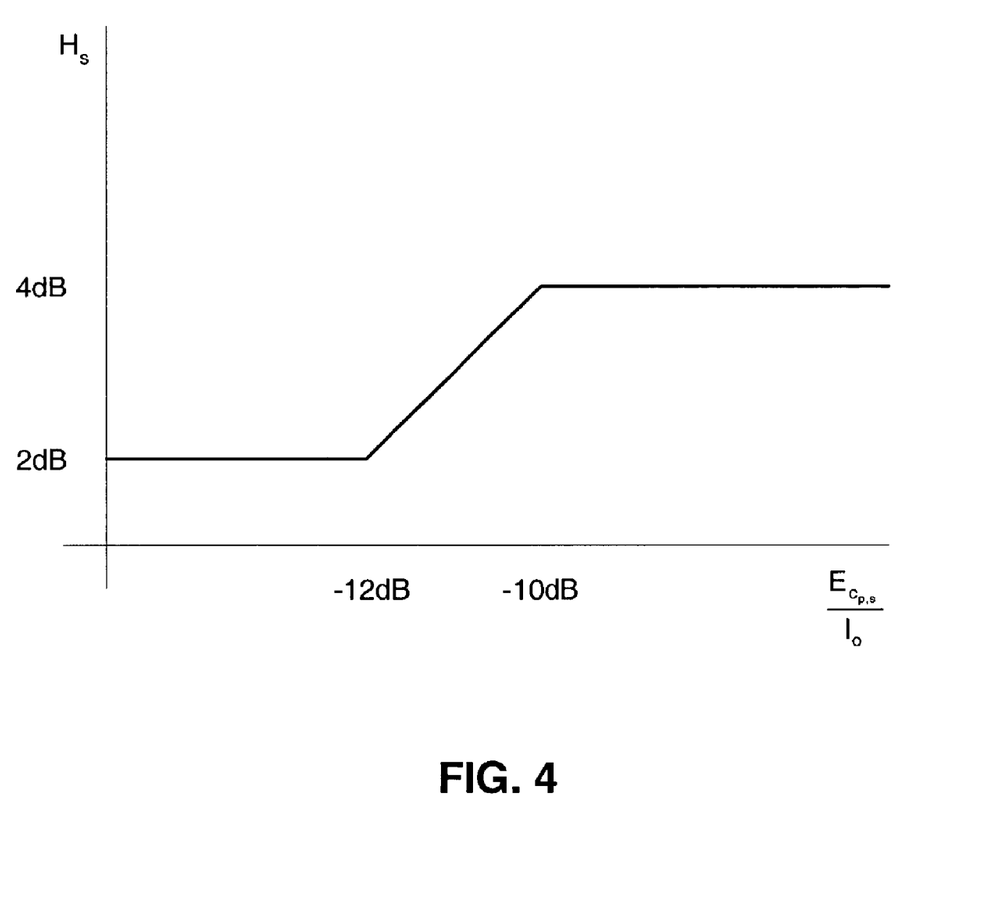
FIG. 4 depicts a graph of a hysteresis function of received pilot power for use with a cell reselection method.

The hysteresis value can be any function of the received signal strength of the currently selected cell. In the exemplary embodiment, the hysteresis value, $H_s$, is determined according to equation 1:

$$H_s = \begin{cases} 2\ dB & \text{when} & \frac{Ec_{p,s}}{I_o} < -12\ dB \\ -\left(10 + \frac{Ec_{p,s}}{I_o}\right) + 2\ dB & \text{when} & -12\ dB < \frac{Ec_{p,s}}{I_o} < -10\ dB \\ 4\ dB & \text{when} & \frac{Ec_{p,s}}{I_o} > -10\ dB \end{cases} \quad (1)$$

where $Ec_{p,s}/I_o$ is the chip energy over interference ($E_c/I_o$) of the Common Pilot Channel (CPICH), measured by the searcher (in dB). $H_s$ is plotted in FIG. 4. Those of skill in the art will recognize that equation 1 is exemplary only, and that any function of received signal strength can be used to determine hysteresis within the scope of the present invention.

Once the hysteresis value is added to the energy of the currently selected cell in step 340, proceed to step 350. In step 350, the cell energies of the monitored set and the current active set are ranked according to measured energy (including the hysteresis-modified energy of the active cell). Proceed to decision block 360. In decision block 360, if the current active cell's energy, as modified, is the highest ranked energy, no cell reselection is required and the process can stop. If not, proceed to step 370 to perform cell reselection to the cell from which the highest energy has been received. After cell reselection is completed, the process terminates.

In the exemplary embodiment, the method embodiment described with respect to FIG. 3 is performed once during each DRX cycle. The mobile station "wakes up" from the low power state during which receiving is deactivated, determines whether cell reselection is in order, in accordance with the method described, performs any additional processing required (such as monitoring the paging channel to determine if an incoming call is being directed to the mobile station, for example), and then reenters the low power state, or "sleeps", for another DRX cycle, if appropriate. The reduction in cell reselections, based on channel information available to the mobile station, allows the mobile station to avoid remaining in the higher-power "awake" state any longer than necessary, thus reducing power consumption and increasing battery life or standby time. At the same time, the mobile station maintains communication with a suitable base station during idle mode, as cell reselection is adapted in response to changing channel conditions experienced by the mobile station.

Figure 5A:
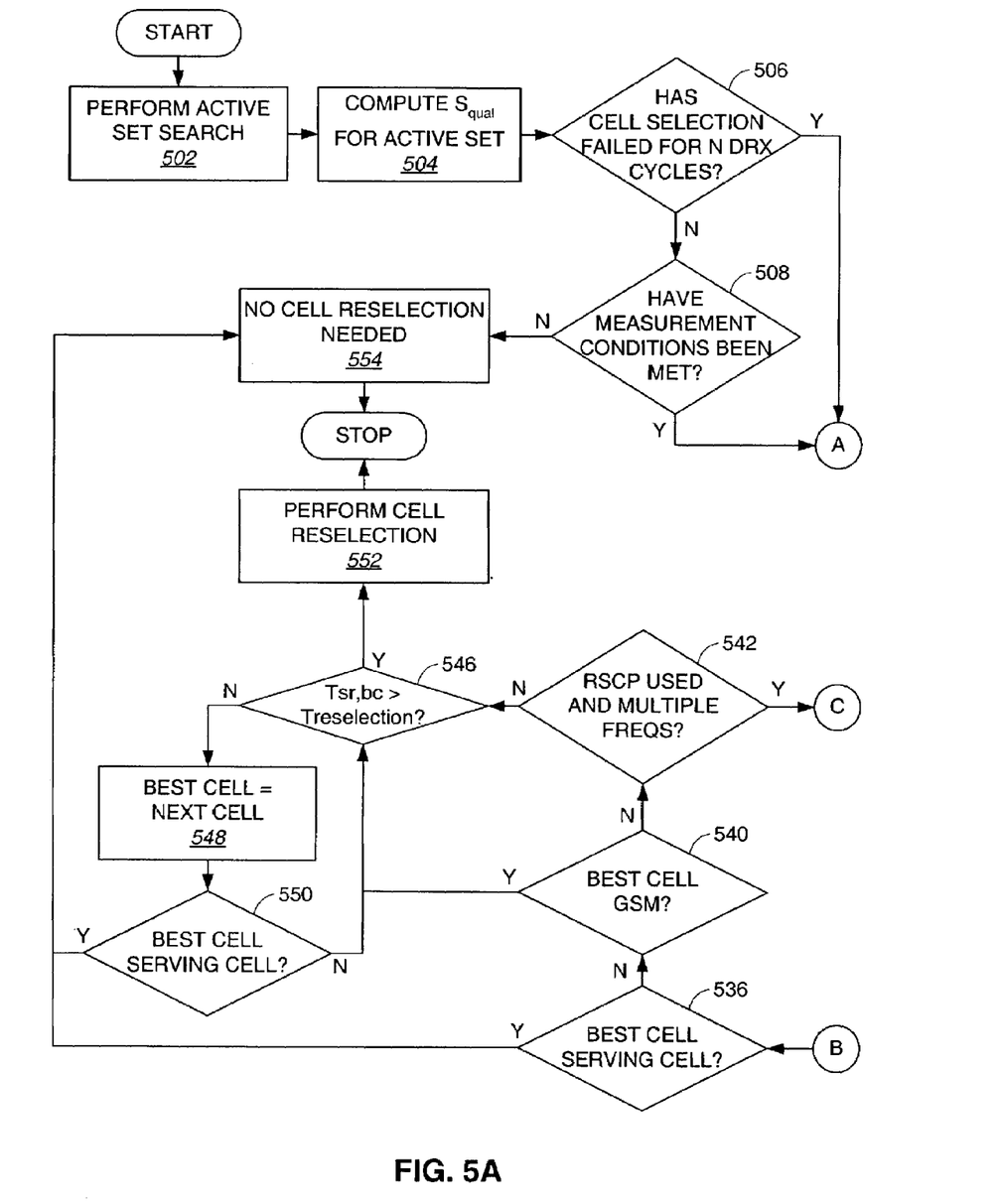
FIGS. 5A and 5B are a flowchart of an embodiment of an alternate method of cell reselection.
Figure 5B:
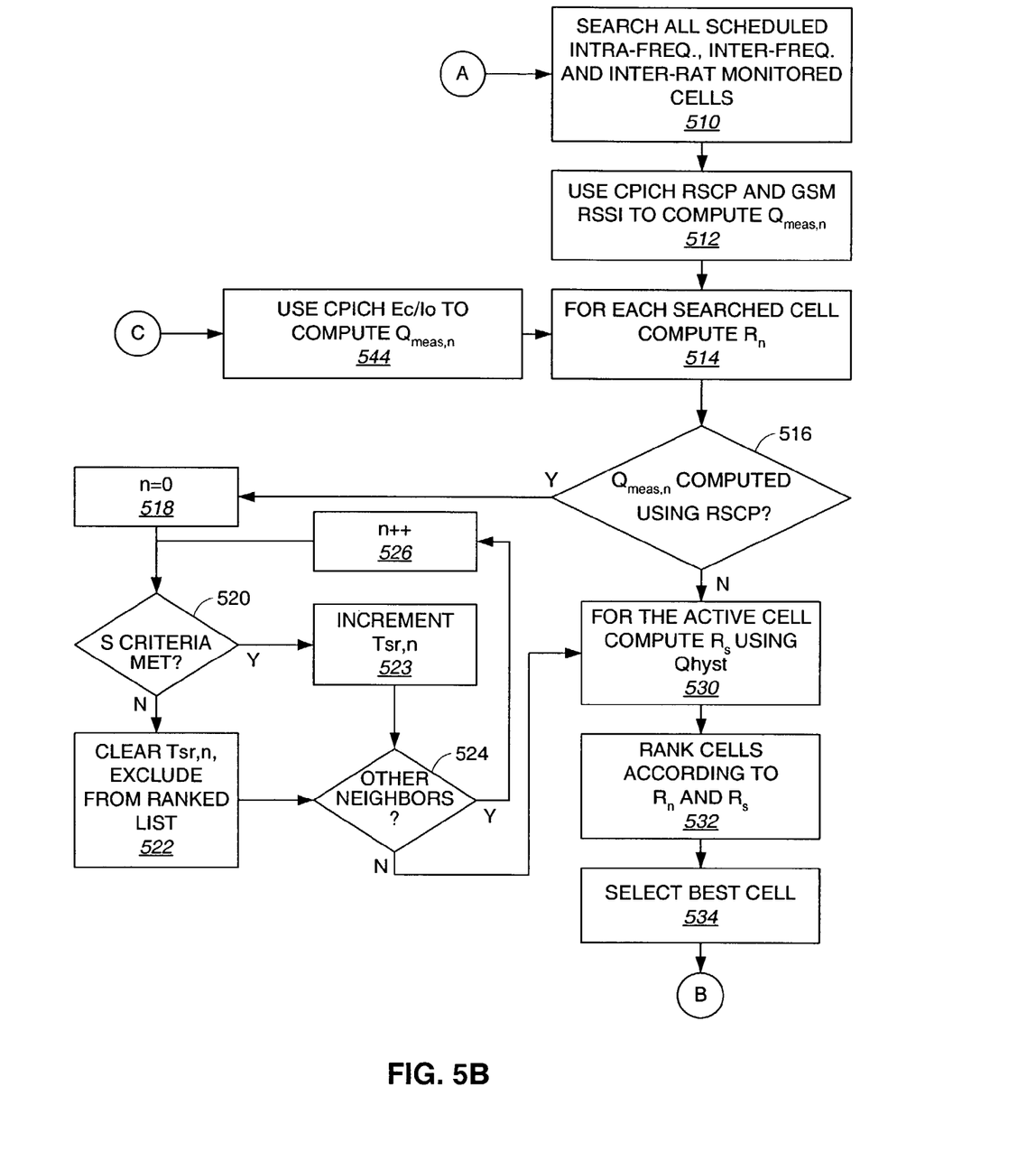

FIGS. 5A and 5B depict an exemplary method of cell selection suitable for mobile stations operable with both W-CDMA and GSM systems, among others. Cell selection and reselection is based on computation of the S criteria, $S_{qual}$ and $S_{rxlev}$, given in equations 2 and 3:

$$S_{qual} = \frac{Ec_p}{I_o} - Q_{qual\ min} \quad (2)$$

$$S_{rxlev} = Ec_p - Q_{rxlev\ min} - \max(UE\_TXPWR\_MAX\_RACH - P\_MAX, 0) \quad (3)$$

where:

$Ec_p/I_o$ is the measured CPICH Ec/Io by the searcher (in dB);

$Q_{qual\ min}$ is the minimum required quality level of the cell;

$Ec_p$ is the measured CPICH Received Signal Code Power (RSCP) (in dBm);

$Q_{rxlev\ min}$ is the minimum required received level in the cell (in dBm);

UE_TXPWR_MAX_RACH is the max power the UE, or mobile station, may use when transmitting on the Random Access Channel (RACH); and P_MAX is the maximum transmit power of the UE, or mobile station.

The W-CDMA standard mandates that the mobile station perform cell selection on the serving cell by computing the S criteria every DRX cycle. The mobile station is expected to monitor the results to ensure that the conditions for cell selection are met. If the cell selection criteria S do not fulfill cell selection requirements for a preset number, N, of consecutive DRX cycles, the mobile station should initiate measurements on the neighbor cells (i.e. the monitored list) and attempt to reselect to another cell, regardless of other rules limiting the mobile station from measuring other cells. The exemplary method embodiment depicted in FIGS. 5A and 5B incorporate the W-CDMA standard provisions as well as various aspects of the present invention. The method can be performed during each DRX cycle subsequent to the mobile station coming out of the low power state during which reception was disabled.

The process begins in step 502, where a search is performed to locate and measure the energy of the pilot of the active set. Proceed to step 504 to compute the S criteria, given in equations 2 and 3 above. Then proceed to decision block 506, to test if cell selection has failed for the current active set. Cell selection fails when the S criteria, $S_{qual}$ and $S_{rxlev}$, are less than zero. In this example, cell selection must fail for N consecutive DRX cycles to initiate a cell reselection. If cell selection has not failed, or has not failed for the requisite N cycles, proceed to decision block 508. If cell selection has failed for N consecutive cycles, proceed to step 510 to begin the reselection process.

In decision block 508, even if cell selection has not failed for N consecutive DRX cycles, as tested in decision block 506, if other criteria are met, the cell reselection process may still be initiated. Any measurement criteria can be deployed for initializing a cell reselection process, as will be recognized by one of skill in the art.

In the exemplary embodiment, three separate types of monitored cells may be scheduled for searching to determine if cell reselection should proceed (described below). If the serving cell's $S_{qual}$, $S_{qual,s}$, falls below the parameter $S_{intrasearch}$, then intra-frequency measurements of monitored cells will be scheduled. $S_{intrasearch}$ may be specified over-the-air by the system. Note that in the exemplary embodiment, a floor is set on $S_{intrasearch}$ by setting it to the maximum of any signaled $S_{intrasearch}$ and $S_{min}$, where $S_{min}$ is computed using the equation for $S_{qual}$ with CPICH $E_c/N_o$ set to −8 dB. If $S_{qual,s}$ falls below the parameter $S_{intersearch}$, then inter-frequency measurements of monitored cells will be scheduled. $S_{intersearch}$ can be signaled over-the-air by the system. If $S_{qual,s}$ falls below the parameter $S_{inter-RAT}$, then alternative Radio Access Technologies (RATs), or inter-RAT measurements of monitored cells will be scheduled. One example inter-RAT search may be to search for neighboring GSM cells, although any alternative system could be scheduled for search within the scope of the present invention. Note that the monitored set need not contain cells of any particular type. The monitored set may contain any combination or subsets of the three types. It follows that the scheduled set of cells may be a subset of the monitored set, regardless of the satisfaction of the three tests just described. If any of the above criteria are satisfied, then proceed to step 510 to begin the process of determining whether cell reselection will take place, as described below. If none of the above criteria are satisfied, then proceed to step 554, where the Radio Resource Controller (RRC) is signaled that no cell reselection is necessary. The process can then stop.

In step 510, all the scheduled intra-frequency, inter-frequency, and inter-RAT monitored cells are searched. Which cells to search can be determined using the criteria just described with respect to decision block 508. Note further that, if no parameter $S_{intrasearch}$ has been specified by the system, then all intra-frequency cells in the monitored list will be searched. If no parameter $S_{intersearch}$ has been specified by the system, then all inter-frequency cells in the monitored list will be searched. If no parameter $S_{inter-RAT}$ has been specified by the system, then all inter-RAT cells in the monitored list will be searched. Proceed to step 512.

In step 512, the quantity $Q_{meas,n}$ is computed for the n neighbor cells scheduled from the monitored list. $Q_{meas,n}$ is an indicator of the received signal power from each neighbor, and in the exemplary embodiment, it may be computed in two different ways, as described further below. Those of skill in the art will recognize that any power measurement indicator can be used throughout this embodiment, within the scope of the present invention. During this step 512, $Q_{meas,n}$ is an absolute power measurement, measured in dBm, which is useful when comparing results between the serving cell, intra-frequency neighbor cells, inter-frequency neighbor cells, as well as inter-RAT neighbor cells. It is computed as the Received Signal Code Power (RSCP) of the CPICH for W-CDMA cells, and the Received Signal Strength Indicator (RSSI) for GSM cells. RSCP is computed as $E_c/I_o+I_o$, which normalizes the results for varying interference levels across multiple frequencies. Once $Q_{meas,n}$ is computed for all the searched neighbors, proceed to step 514. $Q_{meas,n}$ can alternately be computed as CPICH $E_c/I_o$, measured in dB, which will be detailed below with respect to step 544.

In step 514, for each searched cell, compute a ranking value $R_n$, defined as $Q_{meas,n}$-Qoffset$_n$. Qoffset$_n$ is specified over-the-air by the system, and is set to Qoffset1$_n$ when CPICH RSCP or RSSI (for GSM cells) is used to compute $Q_{meas,n}$, as in step 512. Qoffset$_n$ is set to Qoffset2$_n$ when CPICH $E_c I_o$ is used to compute $Q_{meas,n}$, as in step 544, detailed below. Qoffset is specified in dBm for Qoffset1 and in dB for Qoffset2. While use of Qoffset may assist in reducing undesirable cell reselection, particular use of the parameter is not specified by the standard, thus it may not be deployed effectively for limiting cell reselection. Furthermore, it is not responsive to the current state of the communication channel between the serving cell and the mobile station, so it cannot adapt to provide varying levels of cell reselection sensitivity. Proceed to decision block 516.

Decision block 516 provides a branch for the process depending on how step 514 was entered. If $Q_{meas,n}$ was computed using RSCP (or RSSI), as specified in step 512, then proceed to step 518. If not, i.e., step 514 was reached through step 544, proceed to step 530.

In step 518, set n=0. In the loop formed by steps 520–526, n will be used as an index to test the quality of the searched neighbor cells. Proceed to decision block 520, where the S criteria, defined above in equations 2 and 3 are calculated for the $n^{th}$ neighbor. If $S_{qual}$ or $S_{rxlev}$ for the $n^{th}$ neighbor are less than zero, then that neighbor does not meet cell selection criteria. Note that $S_{qual,n}$ is not computed for GSM cells, so the test for $S_{rxlev}$ is used exclusively. Proceed to step 522 and remove the cell from the list of searched neighbor cells. In addition, a timer value Tsr,n is cleared, which is an indicator of how long a cell has met the selection criteria, the use of which is detailed below. If the cell selection criteria is met for the neighbor, proceed to step 523 and increment Tsr,n.

From either step 522 or 523, proceed to decision block 524 to determine if there are any additional neighbors in the list. If so, proceed to step 526, increment n, and return to decision block 520 to test the next neighbor with the cell selection criteria. If not, proceed to step 530.

In step 530, compute the ranking value, $R_s$, for the serving cell. $R_s$ is computed as $Q_{meas,s}$+Qhyst, where $Q_{meas,s}$ is computed for the serving cell using the energy metric used to measure the neighbor cells, i.e., as defined for step 514 or step 544. Qhyst is set to Qhyst1 when the measurement quantity used for ranking is CPICH RSCP, where Qhyst1 can be signaled over-the-air by the system. Qhyst is set to the maximum of Qhyst2 and $H_s$ when the measurement quantity is CPICH $E_c/I_o$. Qhyst2 can be signaled over-the-air by the system. Hs can be computed according to any hysteresis equation, as will be recognized by those skilled in the art. In the exemplary embodiment $H_s$ is computed according to equation 1. Thus, in this embodiment, the system can introduce hysteresis by supplying Qhyst2 over-the-air. However, a floor on the hysteresis value is introduced by $H_s$. As described above with respect to FIG. 3, using $H_s$ allows limiting cell reselection in response to changing channel conditions, making reselection less likely when the channel is relatively good, and more likely when the channel is relatively poor. Once the ranking value $R_s$ is computed for the serving cell, proceed to step 532.

In step 532, rank the serving cell and the measured neighbor cells according to their ranking values, $R_s$ and $R_n$. Proceed to step 534 to select the best cell (identified below with subscript bc) as the cell with the highest rank. Proceed to decision block 536.

In decision block 536, if the best cell is the current serving cell, then proceed to step 554, and indicate that no cell reselection is needed, as described above. If the best cell is a cell other than the current serving cell, additional steps are taken to determine whether a cell reselection should take place. Proceed to decision block 540 to begin that portion of the process.

In decision block 540, if the best cell is a GSM cell, proceed to decision block 546. If not, proceed to decision block 542.

In decision block 542, if the prior pass through step 514 used CPICH RSCP for $Q_{meas,n}$, i.e., step 514 was entered from step 512, and there are multiple frequencies in the ranked monitored list, then the list will be re-ranked using CPICH $E_c/I_o$. In this case, the process continues to step 544. If step 544 has already been entered during the process for the current DRX cycle, or there is only one frequency in the ranked list corresponding to the monitored set, then the process continues to decision block 546. Recall that $RSCP=E_c/I_o+I_o$. $I_o$ may be different across different frequencies, so using RSCP normalizes this difference when an absolute power level is desired. If only one frequency is used in the ranked list, then a second pass using $E_c/I_o$ will not alter the ranking generated with RSCP.

In step 544, as mentioned preciously, CPICH RSCP will be used for $Q_{meas,n}$. Proceed to step 514 and re-compute the ranking values $R_n$ for the monitored list (as modified for any cells which failed the cell selection criteria in the loop formed by steps 518–524, described above. Then the process proceeds to decision block 516, where the path to step 530 will be taken since RSCP is no longer the measurement value used for the ranked list. The monitored cells and the serving cell (modified with hysteresis in step 530) will be re-ranked in step 532, and the best cell selection will be made again in step 534. In some cases, a different best cell will prevail, and decision block 536 and possibly decision block 540 will be revisited and performed as described above. If the current serving cell becomes the new best cell, then the process proceeds to step 554, described above, and cell reselection will not be needed. If the same best cell is still selected, or another best cell, different from the current serving cell, is selected, then the process will proceed to step 546. The process may branch through decision block 540 if the best cell is a GSM cell, or through decision block 542 if the best cell is not a GSM cell. The process will not branch from decision block 542 to step 544 during this second pass, as described above.

As described above, when the best cell is different than the serving cell, decision block 546 will be reached regardless of whether a second pass was made, or whether or not the best cell is a GSM cell. In decision block 546, Tsr,bc must be greater than the parameter Treselection, which indicates the minimum time a cell must have met cell selection criteria before it can be selected (via the reselection process) as the new current serving cell. Treselection can be transmitted over-the-air from the system. If the minimum time indicated by Treselection has been met by the best cell, proceed to step 552. In step 552, an indication is made to the RRC that cell reselection should be made using the best cell as the new serving cell. Then the process can stop.

If the best cell does not meet the minimum time required for satisfaction of the cell selection criteria, proceed to step 548. In step 548, the next best cell, according to the ranking, is selected. If the next best cell is the current serving cell, no cell reselection is needed, and the process proceeds to step 554, described above, and then terminates. If the next best cell is not the current serving cell, proceed back to decision block 546 to test the minimum time requirement for the next best cell. The loop formed by steps 546–550 will continue until a cell is identified for reselection (and step 552 is reached), or the current cell is selected and no cell reselection is perfomed (i.e. step 554 is reached).

If the best cell does not meet the minimum time required for satisfaction of the cell selection criteria, proceed to step 548. In step 548, the next best cell, according to the ranking, is selected. If The next best cell is the current serving cell, no cell reselection is needed, and the process proceeds to step 554, described above, and then terminates. If the next best cell is not the current serving cell, proceed back to decision block 546 to test the minimum time requirement far the next best cell. The loop formed by steps 546–550 will continue until a cell is identified for reselection (and step 552 is reached), or the current cell is selected and no cell reselection is performed (i.e. step 554 is reached).

The embodiment depicted in FIGS. 5A and 5B are just one example of a method of limiting cell reselection utilizing aspects of the invention described herein. This particular example demonstrates the applicability of these aspects to a mobile station equipped to interoperate with multiple systems, i.e. W-CDMA and GSM systems. Those of skill in the art will readily expand the principles taught with respect to FIGS. 5A and 5B to any number of combinations of systems, parameters, and hysteresis equations, including those known in the art as well as those conceived in the future. Those of skill in the art will recognize that the embodiment of FIGS. 5A and 5B is one specific example of the more general method embodiment described in FIG. 3. Various modifications can be made to either embodiment within the scope of the present invention and will be readily adaptable by those of skill in the art.

It should be noted that in all the embodiments described above, method steps can be interchanged without departing from the scope of the invention. The descriptions disclosed herein have in many cases used signals, parameters, and procedures associated with the W-CDMA and GSM standards, but the scope of the present invention is not limited as such. Those of skill in the art will readily apply the principles herein to various other communication systems. Furthermore, channel quality metrics can be used other than those described, and can be measured using pilot signals from various neighboring cells, or any other signal for which a metric indicating the quality of the channels between those various cells and the mobile station. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a processor for identifying a serving cell to intermittently monitor while in idle mode; and
   a channel quality estimator for generating a channel quality metric for the serving cell during a monitoring interval, and
   wherein the processor is further for determining whether or not to search for neighbor cells in the monitoring interval based on the channel quality metric for the serving cell and, if the neighbor cells are searched, for varying a reselection threshold in response to the channel quality metric for the serving cell.

2. The apparatus of claim 1, further comprising:
   a searcher for locating a plurality of neighbor cells and for measuring a corresponding plurality of channel quality metrics, and wherein the processor identifies one of the plurality of neighbor cells for reselection when the corresponding channel quality metric exceeds the reselection threshold.

3. The apparatus of claim 2, wherein the channel quality metrics are computed in response to received pilot power measurements.

4. The apparatus of claim 3, wherein the received pilot power measurement is a carrier RSSI measurement when the neighbor cell is a GSM cell.

5. The apparatus of claim 3, wherein the received pilot power measurement is a pilot RSCP measurement when the neighbor cell is a W-CDMA cell.

6. The apparatus of claim 3, wherein the received pilot power measurement is a pilot energy per chip over interference (Ec/Io) measurement when the neighbor cell is a W-CDMA cell.

7. The apparatus of claim 2, wherein the processor identifies a neighbor cell having a highest channel quality metric among the plurality of neighbor cells for reselection.

8. The apparatus of claim 1, wherein the reselection threshold is the sum of the serving cell channel quality metric and a hysteresis value.

9. The apparatus of claim 1, wherein the processor bypasses the search for the neighbor cells if the channel quality metric for the serving cell exceeds a predetermined value.

10. The apparatus of claim 1, wherein the processor performs reselection in accordance with a timer indicative of an amount of time a neighbor cell meets at least one selection criteria.

11. An apparatus comprising:
    a signal strength estimator for determining a received pilot power for a serving cell; and
    a processor for determining a reselection threshold based on the received pilot power and a hysteresis value, wherein the hysteresis value is:
    set to a first value when the received pilot power is less than a first power level,
    set to a second value when the received pilot power is greater than a second power level; and
    varied linearly between the first and second values as the received pilot power varies between the first and second received pilot power levels.

12. A wireless communication device comprising:
    a processor for identifying a serving cell to intermittently monitor while in idle mode; and
    a channel quality estimator for generating a channel quality metric for the serving cell during a monitoring interval; and
    wherein the processor is further for determining whether or not to search for neighbor cells in the monitoring interval based on the channel quality metric for the serving cell and, if the neighbor cells are searched, for varying a reselection threshold in response to the channel quality metric for the serving cell.

13. A wireless communication system, including a wireless communication device, comprising:
- a processor for identifying a serving cell to intermittently monitor while in idle mode; and
- a channel quality estimator for generating a channel quality metric for the serving cell during a monitoring, and
- wherein the processor is further for determining whether or not to search for neighbor cells in the monitoring interval based on the channel quality metric for the serving cell and, if the neighbor cells are searched, for varying a reselection threshold in response to the channel quality metric for the serving cell.

14. A method of performing cell reselection, comprising:
- identifying a serving cell to intermittently monitor while in idle mode;
- measuring a channel quality metric for the serving cell during a monitoring interval;
- determining whether or nor to search for neighbor cells in the monitoring interval based on the channel quality metric for the serving cell; and
- if the neighbor cells are searched, varying a reselection threshold in response to the channel quality metric for the serving cell.

15. The method of claim 14, wherein the channel quality metric is computed in response to an estimate of received pilot power.

16. The method of claim 15, wherein the channel quality metric is the estimate of received pilot power.

17. The method of claim 15, wherein the channel quality metric is the estimate of received pilot power plus a programmable offset.

18. The method of claim 15, wherein the reselection threshold is the sum of the channel quality metric and a hysteresis offset.

19. The method of claim 18, wherein the hysteresis offset is a first value for a first received pilot power, and a lower value for a lower received pilot power.

20. An apparatus, comprising:
- means for identifier a serving cell to intermittently monitor while in idle mode;
- means for measuring a channel quality metric for the serving cell during a monitoring interval;
- means for determining whether or not to search for neighbor cells in the monitoring interval based on the channel quality metric for the serving cell; and
- means for varying a reselection threshold in response to the channel quality metric for the serving cell, if the neighbor cells are searched.

21. A wireless connnunication system, including a wireless communication device, comprising:
- means for identifying a serving cell to intermittently monitor while in idle mode;
- means for measuring a channel quality metric for the serving cell during a monitoring interval;
- means for determining whether or not to search for neighbor cells in the monitoring interval based on the channel quality metric for the serving cell; and
- means for varying a reselection threshold in response to the channel quality metric for the serving cell, if the neighbor cells are searched.

22. Processor readable media operable to perform the following steps:
- identifying a serving cell to intermittently monitor while in idle mode;
- measuring a channel quality metric for the serving cell during a monitoring interval;
- determining whether or not to search for neighbor cells in the monitoring interval based on the channel quality metric for the serving cell; and
- if the neighbor cells are searched, varying a reselection threshold in response to the channel quality metric for the serving cell.

23. An apparatus comprising:
- a receiver operative to generate a channel quality metric for a serving cell to be intermittently monitored in idle mode and to generate at least one channel quality metric for at least one neighbor cell with which reselection may be performed; and
- a processor operative to determine whether or not to search for neighbor cells in the monitoring interval based on the channel quality metric for the serving cell and, if the neighbor cells are searched, to derive a variable reselection threshold based on the channel quality metric for the serving cell, to identify a neighbor cell having a highest channel quality metric among the at least one neighbor cell, and to perform reselection to the identified neighbor cell if the highest channel quality metric exceeds the variable reselection threshold.

24. The apparatus of claim 23, wherein the receiver is operative to generate the at least one channel quality metric for the at least one neighbor cell if reselection is enabled, and wherein the processor is operative to determine whether to enable reselection based on at least one criterion and, if reselection is enabled, to derive the variable reselection threshold, to identify the neighbor cell, and to perform reselection to the identified neighbor cell.

25. The apparatus of claim 24, wherein the processor is operative to enable reselection if a metric for required signal quality is below a predetermined threshold for a predetermined time period.

26. The apparatus of claim 24, wherein the processor is operative to enable reselection if a metric for required received level is below a predetermined threshold for a predetermined time period.

27. The apparatus of claim 23, wherein the processor is operative to perform reselection to the identified neighbor cell if the identified neighbor cell satisfies at least one cell selection criterion for a predetermined time period.

* * * * *